(12) United States Patent
Favor

(10) Patent No.: US 6,732,236 B2
(45) Date of Patent: May 4, 2004

(54) CACHE RETRY REQUEST QUEUE

(75) Inventor: John G. Favor, Scotts Valley, CA (US)

(73) Assignee: Redback Networks Inc., Sunnyvale, CA (US)

(*) Notice: Subject to any disclaimer, the term of this patent is extended or adjusted under 35 U.S.C. 154(b) by 555 days.

(21) Appl. No.: 09/740,658

(22) Filed: Dec. 18, 2000

(65) Prior Publication Data
US 2002/0078302 A1 Jun. 20, 2002

(51) Int. Cl.[7] .............................................. G06F 12/00
(52) U.S. Cl. ........................ 711/118; 711/140; 711/154
(58) Field of Search ........................... 711/3, 118, 119, 711/133, 140, 144, 154

(56) References Cited

U.S. PATENT DOCUMENTS

| | | | | |
|---|---|---|---|---|
| 5,317,720 A | * | 5/1994 | Stamm et al. ............... | 711/143 |
| 5,333,296 A | * | 7/1994 | Bouchard et al. ........... | 711/171 |
| 5,404,483 A | * | 4/1995 | Stamm et al. ............... | 711/144 |
| 5,432,918 A | * | 7/1995 | Stamm ........................ | 711/156 |
| 5,765,199 A | | 6/1998 | Chang et al. ................ | 711/168 |
| 5,809,320 A | * | 9/1998 | Jain et al. .................... | 712/34 |
| 6,145,054 A | | 11/2000 | Mehrotra et al. ............ | 711/119 |
| 6,148,372 A | | 11/2000 | Mehrotra et al. ............ | 711/122 |
| 6,339,813 B1 | * | 1/2002 | Smith, III et al. ........... | 711/144 |

* cited by examiner

Primary Examiner—Tuan V. Thai
(74) Attorney, Agent, or Firm—Morrison & Foerster LLP

(57) ABSTRACT

In accordance with one aspect of the present invention, an access request associated with a cache miss to a single cache line having a pending cache fill can be handled in a non-blocking manner by storing the cache miss in a retry queue while the cache fill is pending. The retry queue then detects the return of the cache fill and inserts the access request associated with the cache miss onto the cache pipeline for processing.

22 Claims, 3 Drawing Sheets

CACHE RETRY REQUEST QUEUE

BACKGROUND OF THE INVENTION

1. Field of the Invention

The present invention relates in general to cache memory and more particularly to handling cache misses.

2. Description of Related Art

In general, packet processors have cache memory closely coupled to Execution Units (EUs) in an effort to speed access to memory information stored in main memory. However, cache memory only holds a fraction of the content that can be stored in main memory. Thus, the cache memory is constantly replacing its contents with information from the main memory to remain current with incoming access requests from one or more EUs.

Although the cache memory tries to remain current with incoming access requests, at some point in time, memory locations referenced by an EU load or store may not be in the cache memory, resulting in a cache miss. A cache miss triggers a refill operation that may take several clock cycles to complete. Meanwhile, one or more access requests from the EUs may hit on the cache line having the pending refill causing further cache misses.

One earlier solution to avoiding cache misses on a given cache line having a pending refill is to simply stall the EUs until the pending refill on the given cache line is completely processed. However, stalling the EUs from transmitting access requests has a negative performance impact. This is especially true in a case where cache memory is shared by multiple EUs. A second earlier solution is to treat a subsequent cache miss to a cache line having a pending refill as a normal cache miss. Thus a fill request for the subsequent cache miss is sent out to memory. The problem with this solution is that subsequent refill request is redundant with the already pending refill.

A third earlier solution to avoiding cache misses on a given cache line having a pending refill is to send a signal back to the requesting EU rejecting the access request. The problem with this prior art solution is that the EUs require extra logic to track all of its access requests. This extra logic requires more area and makes the EU design much more complex. It has become desirable for the cache memory to be able to continue to serve subsequent EU access requests to any and all memory locations while a cache fill is in progress without stalling the EUs. As will be disclosed in more detail below, the present invention advantageously achieves these and other desirable results.

SUMMARY OF THE INVENTION

In accordance with one aspect of the present invention, an access request associated with a cache miss to a single cache line having a pending cache fill can be handled in a non-blocking manner by storing the cache miss in a retry queue while the cache fill is pending. The retry queue then detects the return of the cache fill and inserts the access request associated with the cache miss onto the cache pipeline for processing.

DETAILED DESCRIPTION OF THE PREFERRED EMBODIMENT

Overview

Figure 1:
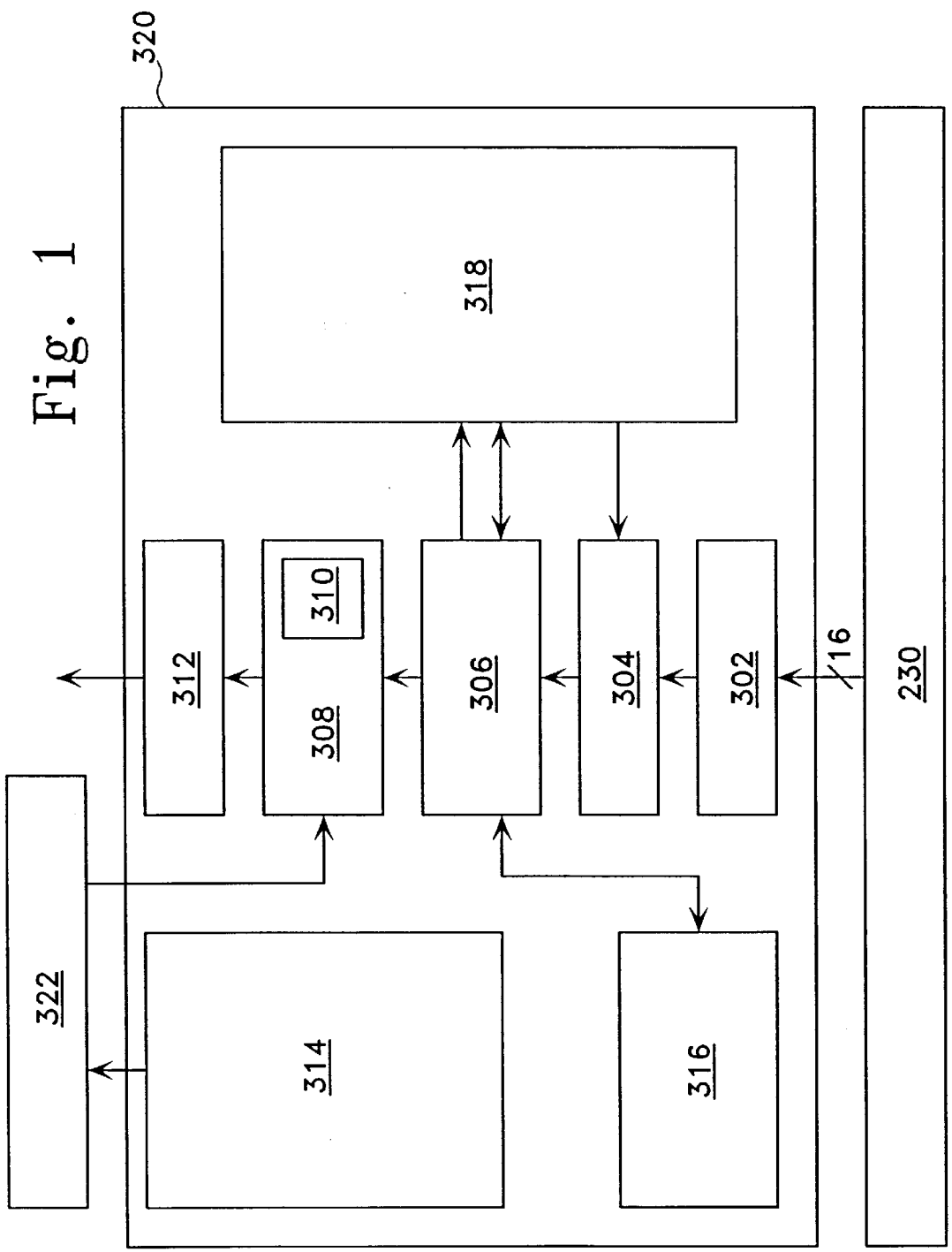
FIG. 1 is a block diagram of a cache bank.

FIG. 1 shows a block diagram of a cache memory bank 320 coupled to multiple EUs 230 and a memory channel module 322. The memory channel module 322 can represents any number of memory channels connected to cache bank 320. In one embodiment, the memory channel module 322 can include multiple memory controllers, a register controller through which on-chip registers are accessed, and a Serial Communication Link controller. The cache bank 320 comprises 128 cache lines organized into thirty-two sets of four cache lines. The cache bank 320 also comprises a cache tag array 316 having 128 cache tag entries corresponding to each of the 128 cache lines organized into groups of four. Each cache tag provides information regarding the state of its corresponding cache line. A cache line can be invalid, valid clean, valid dirty, or busy.

In operation, the cache bank 320 receives multiple access request signals from each of the multiple EUs 230. There are sixteen EUs in a current embodiment of the invention. Each access request generated by a single EU 230 is processed in the order in which it is generated in a pipeline manner. The EUs 230 can generate multiple types of access requests including requests to access SRAM, non-cacheable accesses requests, cacheable accesses requests which hit in the cache, and cacheable accesses which miss in the cache. In the case of a cache miss, the access request is transmitted to the memory channel module to retrieve the requested data back to the cache bank 320. In the meantime, one or more EUs 230 may generate one or more access requests which hit on the same cache line having a pending fill causing further cache misses. It is desirable for the cache memory to be able to continue to serve subsequent EU access requests to any and all memory locations while a cache fill is in progress without stalling the EUs. As is discussed in greater detail below, the present invention advantageously achieves these and other desirable results.

Referring to FIG. 1, in a current embodiment of the invention, an access request module 302 can receive between zero and sixteen access request signals from the EUs 230 per clock and transmits them to the arbitration module 304. The arbitration module 304 then selects one access request and transmits the request to the address lookup module 306. Once the arbitration module 304 accepts an asserted access request, an acceptance acknowledgement signal is transmitted to the requesting EU 230. Upon receipt of the acceptance acknowledgement signal, the requesting EU 230 is free to present another access request to the access request module 302. The arbitration module 304 also interacts with the RRQ 318, which will be discussed further below.

After receiving the accepted access request, the address lookup module 306 decodes the access request to determine information about the request such as the address of the requested data and the type of access request (e.g. cacheable or non-cacheable). As stated previously, there can be four types of access requests including a cacheable load or store which hits in the cache, a cacheable load or store which misses in the cache, a load or store to SRAM, and a non-cacheable load or store.

Cacheable Access Requests

Cache Hit

Figure 2:
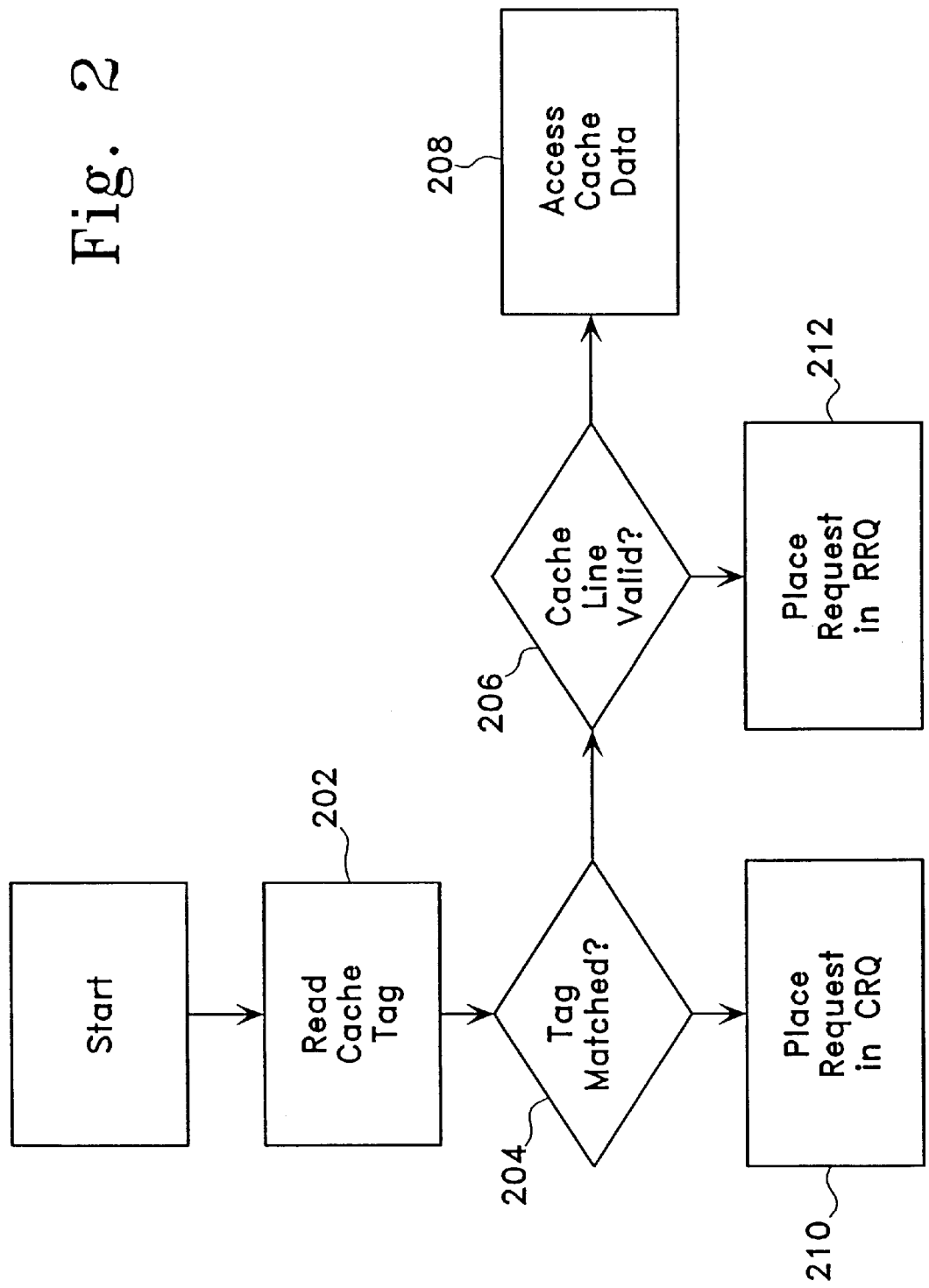
FIG. 2 is a decision process flow diagram for the address lookup module with respect to cacheable access requests.

FIG. 2 shows a flow diagram depicting the steps taken if the access request is cacheable. The address lookup module 306 accesses the corresponding cache tag from the cache tag array 316 in step 202. In step 204, the address lookup module determines if a matching cache tag is found indicating a cache hit. In the case of a cache hit, the address lookup module then determines if the state of the cache line is valid clean, valid dirty, busy, or invalid in step 206. If the state of the cache line is valid clean or valid dirty, then the address lookup module 306 forwards the access request to the data access module 308 where cacheable stores are written to the appropriate location in the data storage block 310 in step 208. In the case of a cacheable load, data is read from the data storage block 310, transmitted to the data return module 312, and returned to the requesting EU 230. If it is determined that the cache line is busy in step 206, then the access request is placed in the RRQ in step 12 which is discussed in greater detail below.

Cache Miss

Referring again to step 204 in FIG. 2, if the address lookup module 306 determines that no matching cache tag is found indicating a cache miss, then the address lookup module 306 forwards a cache fill request to the Cache Request Queue (CRQ) 314 in step 210. Next, the address lookup module 306 chooses one of four cache lines within the associated cache set to allocate a new cache line for the pending cache fill, changes the state of the chosen cache line to a special state called busy, and re-initializes the address tag of the chosen cache line to correspond to the new address that caused the miss cache in the cache tag array 316 in step 216. The CRQ 314 then presents the access request to the memory channel module 322. If the access request is a store, the data will be stored in the appropriate target in the memory channel module 322. If the access request is a load, the data is read from the appropriate target and returned directly back to the requesting EU 230. Furthermore, the target performs a cache fill by transmitting a full 32 byte block of data to the data access module 308. The data access module 308 then stores the 32 byte block of data in the data storage block 310.

Retry Request Queue

The amount of time required for the memory channel module 322 to return a pending cache fill to the data access module 308 can take many clocks. In the mean time, the cache bank 320 may receive numerous new access requests from the sixteen EUs 230. Generally, these new requests access different cache lines within the same cache bank 320, different cache banks 320 or are simply non-cacheable requests. However, it is possible that the arbitration module 304 may accept a new cacheable access request on a cache line that has a pending cache fill and forward it to the address lookup module 306. In this case, the lookup module 306 decodes the new access request and accesses the cache tag for the new access request in the cache tag array 316. The address lookup module 306 then determines that the access request does hit in the cache, but the state of the cache line is busy due to the pending cache fill. Thus, the access request cannot be processed until the cache fill returns and gets stored in the data storage block 310. Therefore, the address lookup module 306 places the new cacheable access request into the tail end of the Retry Request Queue (RRQ) 318.

Figures 3, 4:
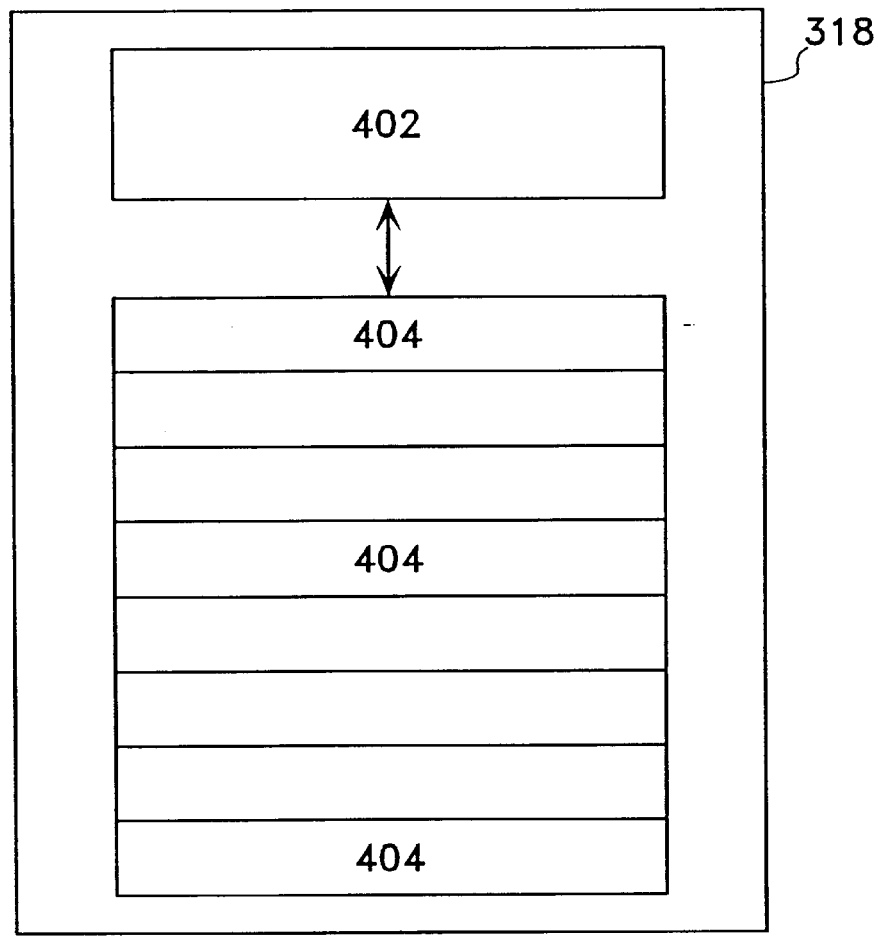
FIG. 3 is a block diagram of a retry request queue (RRQ) as depicted in FIG. 1.
FIG. 4 is a block diagram of an RRQ entry as depicted in FIG. 3.

FIG. 3 shows a block diagram of one embodiment of the RRQ 318 according to the present invention. The RRQ comprises eight RRQ entries 404 and a control logic module 402 which communicates with the address lookup module 306. FIG. 4 shows a block diagram of the multiple fields comprised in an RRQ entry 404. The multiple fields include an address tag 502, a valid bit 504, a retry bit 506, and other fields containing other information 508. At reset, all of the RRQ entries 404 are invalid (i.e. empty). When the RRQ 318 receives an access request to be tried later in an RRQ entry 404 from the address lookup module 306, the control logic module 402 within the RRQ 318 changes the valid bit 504 from invalid to valid and initializes the retry bit 506 to ineligible. The retry bit 506 indicates whether or not an RRQ entry 404 is eligible for retry. The address tag 502 is a seven bits and identifies the RRQ entry 404 with its associated cache line. Five of the seven bits identify which of the thirty-two cache sets of four cache lines the RRQ entry 404 is associated with. The two remaining bits identify which of the four cache lines within the particular cache set the RRQ entry 404 is associated with.

All new RRQ entries 404 enter the RRQ 318 through the tail (i.e. the bottom or the first entry 404) of the queue in the order that they are received. Older RRQ entries 404 shift toward the head (i.e. top) of the RRQ 318 as old entries 404 are removed and space is available. However, each RRQ entry 404 can be pulled out of the RRQ 318 in any arbitrary order as determined by the RRQ 318 control logic module 402. As entries are pulled out of the RRQ 318 the remaining RRQ entries 404 shift toward the head of the RRQ 318 to fill any vacancies. The control logic module 402 constantly monitors the RRQ entries 404 to see if any are both valid and eligible for retry.

Eventually, the pending cache fill, including the data and the associated address tag, returns from the appropriate target and is stored in the data storage block 310. The address lookup module 306 detects the cache fill, receives a copy of the seven bit address tag associated with the cache fill from the data storage block 310, and changes the state of the corresponding cache line from busy to valid clean. The address lookup module 306 also transmits the seven bit address tag of the cache fill to the RRQ 318. The RRQ 318 control logic module 402 then compares the seven bit address tag 502 to all entries located in the RRQ 318 and changes the retry bit from ineligible to eligible for all matching entries. The RRQ 318 control logic module 402 can determine that there are no matching entries, one matching entry, or multiple matching entries. The first case is where the RRQ 318 control logic module 402 finds no matching entries eligible to be retried, therefore the RRQ 318 control logic module 402 does nothing.

Single cache miss eligible for retry

In a second case, the RRQ 318 control logic module 402 finds one matching entry eligible to be retried. The RRQ 318 control logic module 402 then tells arbitration module 304 to stop accepting requests from the EUs for one clock so the eligible retry can be inserted into the arbitration module 304. Only one eligible retry can be passed to the arbitration module 304 per clock. The eligible entry then gets removed from the RRQ 318 and transmitted to the address lookup module 306 and in general is processed like a cacheable access request as previously described in detail above.

Multiple cache misses eligible for retry

In a third case, the RRQ 318 control logic module 402 may find multiple RRQ entries 404 that are eligible for retry. Again, the RRQ 318 control logic module 402 tells the arbitration module 304 to stop accepting requests from the EUs for one clock so an eligible retry can be inserted in the arbitration module 304. The RRQ 318 control logic module 402 then inserts the eligible RRQ entry 404 closest to the head of the RRQ 318 into the arbitration module 304. It is important that multiple eligible retries associated with the same cache line are retried in the order that they were placed in the RRQ 318. The RRQ 318 may contain other entries which are eligible, but associated with other cache lines. In one embodiment of the present invention, eligible retries are accepted by the arbitration module 304 once every four clocks. However, it should be recognized that the arbitration module 304 can accept retries at any number of clock intervals.

Since retries may be processed once every four clocks, it is possible that a new cacheable access accepted by the arbitration module 304 from the EUs 230 may try to access the same cache line associated with pending retries. The new cacheable access is then transmitted to the address lookup module 306. The address lookup module 306 accesses the cache and determines that there is a cache hit and the cache line is valid clean. Next, the address lookup module 306 transmits the seven bit address tag to the RRQ 318 control logic module 402 which compares the seven bit address tag against the RRQ entries 404. If the RRQ 318 finds a match, then the new cacheable access must be placed in the tail of the RRQ 318 behind any pending retries. This is necessary to maintain the desired order that corresponds to the original order the EU 230 generated these access requests. However, in this case, the retry bit 506 of the new cacheable access will be immediately set to eligible.

Ensure retried cache misses hit in the cache

In general, the arbitration module 304 will process each eligible retry like a cacheable access request as previously described in detail above. However, it is possible that one of the eligible retries may miss in the cache. A given address on a given cache line that misses in the cache falls within a given cache set comprised of four cache lines. When an access request misses in the cache, it gets placed in the CRQ 314 and one of four cache lines within the associated cache set gets reallocated to receive the pending cache fill. If a cache line having pending retries gets replaced or reallocated to receive a pending cache fill, then all of the pending retries will miss in the cache. This could cause numerous complexities. For example, if a retry misses in the cache, then it will be placed in the CRQ 314 and be treated as a cacheable miss. Meanwhile, the other multiple eligible retries associated with the retry that missed in the cache will be processed and learn that the cache line is now busy. Thus all of the pending eligible retries will get placed back in the RRQ 318 again until the pending cache is filled again. To avoid these complications and for the sake of performance purposes, the present invention ensures that all retries will hit in the cache.

To guarantee that all retries hit in the cache between the time that a cache fill completes and until the last related retry is processed, the address lookup module 306 control logic prevents the cache line associated with the completed cache fill from being reallocated by the other three cache lines belonging to the same cache set. Note that it is possible for there to be one or more cache lines within a cache set which have pending retries. When the address lookup module 306 receives a cacheable access request that misses in the cache, the address lookup module 306 transmits the seven bit address tag to the control logic module 402 in the RRQ 318 to find matching entries. The control logic module 402 in the RRQ 318 compares the five bits which represent the cache set associated with the cache line against all RRQ entries 404. If the RRQ 318 control logic module 402 finds any matching entries, then the RRQ 318 control logic module 402 compares the remaining two bits of the seven bit address tag 502 to determine which of the four cache lines within that cache set the address lookup module 306 needs to avoid replacing.

Note that it is very rare, but possible that all four cache lines within a cache set are present in the RRQ 318, thus none of the four cache lines can be replaced. If a cacheable access request tries to access one of the four cache lines within this cache set, then the cacheable access request will be treated as a non-cacheable load. The access request is placed in the CRQ 314 and sent to the appropriate memory target. If the access request is a store, it will simply store the data in the appropriate memory target. If the access request is a load, then the memory target will send the data directly back to the EU. No data will be returned to the cache. The case that all four cache lines within a set cannot be replaced is so rare that effect on performance is negligible.

Although the present invention has been described in conjunction with particular embodiments illustrated in the appended drawings figures, various modifications can be made without departing from the spirit and scope of the present invention. Therefore, the present invention should not be construed as limited to the specific forms shown in the drawings and described above.

We claim:

1. A method for handling a cache miss to a single cache line having a pending cache fill in a non-blocking manner, comprising the steps of:

storing an access request associated with the cache miss in a retry queue until the pending cache fill returns to the cache;

detecting the return of the cache fill to the cache;

determining if the access request is eligible for retry; and processing an access request if it is determined to be eligible for retry.

2. The method of claim 1, wherein the retry queue comprises an entry.

3. The method of claim 2, wherein the entry comprises an address tag field, a valid bit field, and a retry bit field.

4. The method of claim 3, wherein the storing step further comprises the steps of:

receiving the access request associated with the cache miss in the retry queue from an address lookup module;

storing an address tag associated with the access request in the address tag field of the entry;

initializing the valid bit field of the entry to valid; and initializing the retry bit of the entry to ineligible.

5. The method of claim 4, wherin the determining step further comprises the steps of:

receiving an address tag associated with the cache fill in the retry queue from the address lookup module;

comparing the cache fill address tag against the address tags associated with each cache miss located in the retry queue; and changing the retry bit of each access request address tag that matches the cache fill address tag from ineligible to eligible.

6. The method of claim 1, wherein the access request associated with the cache miss is initially stored in a tail end of the retry queue, and further wherein the access request is shifted toward a head of the retry queue as other access requests associated with other cache misses are removed from the retry queue.

7. A method for handling a cache miss to a single cache line having a pending cache fill in a non-blocking manner, comprising the steps of:

receiving the access request associated with the cache miss in the retry queue from an address lookup module;

storing an address tag associated with the access request in the address tag field of the entry;

initializing the valid bit field of the entry to valid;

initializing the retry bit of the entry to ineligible;

detecting the return of the cache fill to the cache;

determining if the access request is eligible for retry; and processing the access request if it is determined to be eligible for retry.

8. The method of claim 7, wherein the retry queue comprises an entry.

9. The method of claim 8, wherein the entry comprises an address tag field, a valid bit field, and a retry bit field.

10. The method of claim 7, wherein the access request associated with the cache miss is initially stored in a tail end of the retry queue, and further wherein the access request is shifted toward a head of the retry queue as other access requests associated with other misses are removed from the retry queue.

11. The method of claim 7, wherin the determining step further comprises the steps of:

receiving an address tag associated with the cache fill in the retry queue from the address lookup module;

comparing the cache fill address tag against the address tags associated with each cache miss located in the retry queue; and changing the retry bit of each access request address tag that matches the cache fill address tag from ineligible to eligible.

12. An apparatus for handling a cache miss to a single cache line having a pending cache fill in a non-blocking manner, comprising:

an entry configured to store an access request associated with the cache miss in a retry queue until the pending cache fill returns to the cache; and a control logic module configured to detect the return of the cache fill to the cache and process the access request after detecting the return of the cache line for the cache.

13. The apparatus of claim 12, wherein the entry further comprises an address tag field, a valid bit field, and a retry bit field.

14. The apparatus of claim 12, wherein the access request associated with the cache miss is initially stored in a tail end of the retry queue, and further wherein the access request is shifted toward a head of the retry queue as other access requests associated with other cache misses are removed from the retry queue.

15. The apparatus of claim 12, wherein the control logic module is configured to:

receive the access request associated with the cache miss from an address lookup module;

store an address tag associated with the access request in the address tag field of the entry;

initialize the valid bit field of the entry to valid; and initialize the retry bit of the entry to ineligible.

16. The apparatus of claim 12, wherein the control logic module further configured to:

receive an address tag associated with the cache fill in the retry queue from the address lookup module;

compare the cache fill address tag against the address tags associated with each cache miss located in the retry queue; and change the retry bit of each access request address tag that matches the cache fill address tag from ineligible to eligible.

17. An apparatus for handling a cache miss to a single cache line having a pending cache fill in a non-blocking manner, comprising the steps of:

means for storing an access request associated with the cache miss in a retry queue until the pending cache fill returns to the cache;

means for detecting the return of the cache fill to the cache;

means for determining if the access request is eligible for retry; and means for processing the access request if it is determined to be eligible for retry.

18. The apparatus of claim 17, wherein the retry queue comprises an entry.

19. The apparatus of claim 18, wherein the entry comprises an address tag field, a valid bit field, and a retry bit field.

20. The apparatus of claim 19, wherein the means for storing further comprises:

means for receiving the access request associated with the cache miss in the retry queue from an address lookup module;

means for storing an address tag associated with the access request in the address tag field of the entry;

means for initializing the valid bit field of the entry to valid; and means for initializing the retry bit of the entry to ineligible.

21. The apparatus of claim 20, wherin the means for determining further comprises:

means for receiving an address tag associated with the cache fill in the retry queue from the address lookup module;

means for comparing the cache fill address tag against the address tags associated with each cache miss located in the retry queue; and means for changing the retry bit of each access request address tag that matches the cache fill address tag from ineligible to eligible.

22. The apparatus of claim 17, wherein the access request associated with the cache miss is initially stored in a tail end of the retry queue, and further wherein the access request is shifted toward a head of the retry queue as other access requests associated with other cache misses are removed from the retry queue.

* * * * *

UNITED STATES PATENT AND TRADEMARK OFFICE
CERTIFICATE OF CORRECTION

PATENT NO.       : 6,732,236 B2  
APPLICATION NO.  : 09/740658  
DATED            : May 4, 2004  
INVENTOR(S)      : Favor, John G.

It is certified that error appears in the above-identified patent and that said Letters Patent is hereby corrected as shown below:

On the Title Page, (*) Notice, change "555 days" to –371 days--.

Signed and Sealed this

Twenty-ninth Day of August, 2006

JON W. DUDAS  
*Director of the United States Patent and Trademark Office*